US009259745B2

(12) United States Patent
Kocer et al.

(10) Patent No.: US 9,259,745 B2
(45) Date of Patent: Feb. 16, 2016

(54) NH3 FAULT AND DISTRIBUTION VARIANCE DETECTION SYSTEM

(71) Applicant: Raven Industries, Inc., Sioux Falls, SD (US)

(72) Inventors: Jared Ernest Kocer, Sioux Falls, SD (US); Joshua D. Grabow, Sioux Falls, SD (US); Warren L. Thompson, Baltic, SD (US); Steve S. Jensen, Sioux Falls, SD (US); Patrick A. Hansen, Tea, SD (US); Nicholas O. Michael, Sioux Falls, SD (US); Scott Porter, Marble Falls, TX (US); Clarence Walt Fowler, Elgin, TX (US); David Anthony Fowler, Austin, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 220 days.

(21) Appl. No.: 13/838,104

(22) Filed: Mar. 15, 2013

(65) Prior Publication Data

US 2014/0263709 A1     Sep. 18, 2014

(51) Int. Cl.
*B05B 3/00*       (2006.01)
*A01G 27/00*   (2006.01)
*B05B 1/30*       (2006.01)
*B05B 1/20*       (2006.01)
*B05B 12/08*     (2006.01)
*B05B 13/00*     (2006.01)

(52) U.S. Cl.
CPC ... *B05B 1/30* (2013.01); *B05B 1/20* (2013.01); *B05B 1/3006* (2013.01); *B05B 12/085* (2013.01); *B05B 13/005* (2013.01)

(58) Field of Classification Search
CPC ... A01G 25/092; A01G 25/09; A01G 25/162; A01G 25/165; B05B 1/20
USPC ............. 239/722, 723, 726, 159, 163, 67–69
See application file for complete search history.

(56) References Cited

U.S. PATENT DOCUMENTS

| 5,310,113 | A | * | 5/1994 | Cowgur ......................... 239/10 |
| 5,865,379 | A | * | 2/1999 | Dahl .............................. 239/690 |
| 6,666,384 | B2 | * | 12/2003 | Prandi ............................... 239/1 |
| 8,191,795 | B2 | * | 6/2012 | Grimm et al. ..................... 239/1 |
| 2004/0128045 | A1 | * | 7/2004 | Benneweis ...................... 701/50 |
| 2004/0135001 | A1 | * | 7/2004 | Collins ............................ 239/68 |

* cited by examiner

*Primary Examiner* — Davis Hwu

(74) *Attorney, Agent, or Firm* — Schwegman Lundberg & Woessner, P.A.

(57) ABSTRACT

This document discusses, among other things, apparatus and methods for a multi-section applicator having variable-rate sections. In an example, an apparatus can include at least one distribution manifold, a user interface, and an applicator controller. The at least one distribution manifold distributes a substance and can include an inlet port configured to receive the substance, a plurality of outlet ports, one or more sensors located at an outlet port, a controllable valve that supplies the substance to the inlet port. The applicator controller measures a value of the distribution parameter using the sensor signal produced by the at least one sensor of an outlet port, detects when the measured value differs from a specified target value by more than a specified error threshold value, and presents an indication, using the user interface, that the measured value differs from the target value according to the detection.

22 Claims, 4 Drawing Sheets

NH3 FAULT AND DISTRIBUTION VARIANCE DETECTION SYSTEM

BACKGROUND

Liquid applicators, such as sprayers, have assisted in distributing liquids or liquids including gas components to various objects. In certain applications, such as applying an agricultural substance to a field, an applicator can assist in applying the substance in an even manner so as to create a uniform coverage while at the same time not wasting a substantial amount of the substance. Agricultural applicators can include one or more distribution booms or tool bars that are long enough (e.g., 60 feet to 150 feet) to reach multiple rows of crops at one pass. Applicators can be complex and can include multiple distribution paths or flow streams from one or more storage tanks to valves or nozzles at the point of application. Faults or variations in distribution can occur at any point in the distribution lines from a main distribution point (e.g., a reservoir) to a point of application (e.g., a coulter). Typically, if a user suspects that there is a fault with the distribution system or a problem due to variation in application by the applicator, the user inspects manual gauges or other indicators disposed at various locations of the applicator. Thus, the resolution and capabilities of custom liquid applications is limited by the current liquid application apparatus and methods.

Overview

This document discusses, among other things, apparatus and methods for identifying faults in an applicator system. An applicator apparatus includes at least one distribution manifold, a user interface, and an applicator controller. The at least one distribution manifold distributes a substance and can include an inlet port configured to receive the substance, a plurality of outlet ports and a controllable valve that supplies the substance to the inlet port. An outlet port can include a nozzle configured to release the substance and at least one sensor configured to produce an electrical sensor signal representative of a distribution parameter at the nozzle. The applicator controller is electrically coupled to the user interface and is configured to measure a value of the distribution parameter using the sensor signal produced by the at least one sensor of an outlet port, detect when the measured value differs from a specified target value by more than a specified error threshold value, and present an indication, using the user interface, that the measured value differs from the target value according to the detection.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
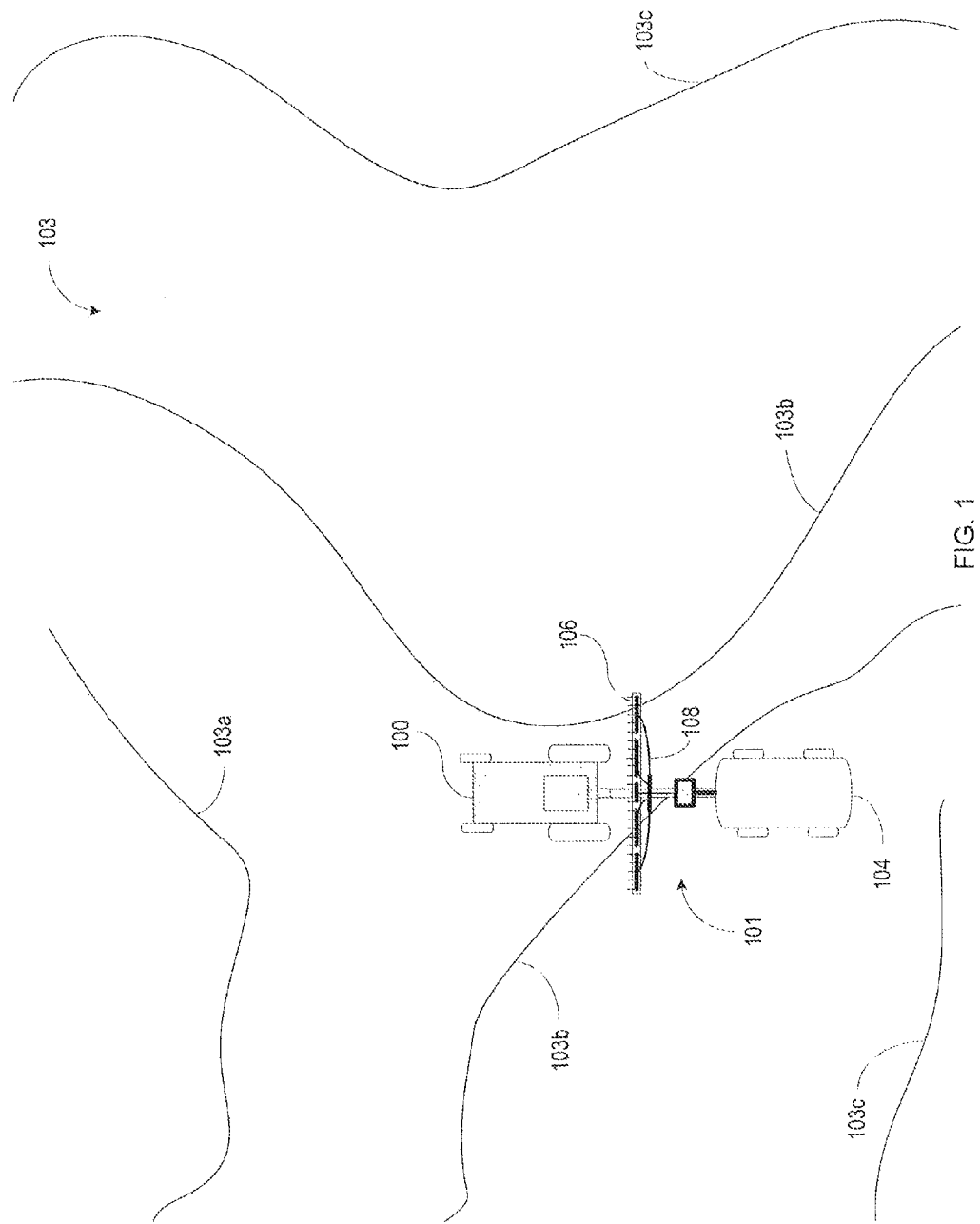
FIG. 1 illustrates generally self-propelled vehicle with an example liquid applicator system superimposed with a custom substance coverage map.

The present inventors have recognized methods and apparatus for simultaneously applying, releasing, or distributing a substance using a plurality of applicator sections. Each section can be controlled according to a predefined application recipe, or coverage map. In certain examples, the substance can be a liquid or a gas, or a combination of liquid and gas. This document describes the present subject matter in terms of an agricultural application of a liquid or liquid/gas, such as anhydrous ammonia ($NH_3$), but the subject matter is not so limited. For example, the present subject matter can be applied to other coverage application scenarios including, but not limited to, painting, industrial spray systems, coating, planters, center pivot irrigation systems, marine spraying systems, airborne spray booms, rail based sprayers and applicators, roadside sprayers with booms, mowers, etc.

In certain examples, an applicator system such as a liquid application system can include a servo valve system including a valve, a servo actuator to open and close the valve, a position sensor to provide information about the position of the valve, a processor for receiving a flow command and positioning the valve using the servo actuator and the position information to provide the proper flow. In certain examples, the servo valve system can include a flow meter to provide actual flow information for positioning the valve using the servo actuator. In certain examples, the servo valve system can provide liquid to one or more nozzles and the servo valve system can include an input for receiving pressure information related to substance flow to the nozzles and can use the pressure information for positioning the valve to achieve more precise flow of the substance at the nozzles. In certain examples, pressure information can be used to calibrate the servo valve, to identify an effective orifice size of a nozzle associated with the flow of the servo valve, and to identify problems such as a plugged nozzle.

In certain examples, a liquid application system can include a main pump for providing a base flow to a nozzle distribution system. In certain examples, a controller can control the main pump using computed aggregate flow information from a GPS based coverage map. In some examples, the liquid application system can include one or more flow meters to provide actual flow information and the controller can use the actual flow information to finely adjust the operation of the main pump to more precisely provide the desired flow of liquid to the distribution system.

In certain examples, a liquid application system can include a tiered control scheme including a main pump and a plurality of distribution sections each of which can include a servo valve system supplying flow to one or more nozzles. In some examples, a liquid application system can include an applicator controller configured to interface with a field computer system to receive GPS information, to receive custom coverage maps, to provide general flow control commands to each tier of the liquid application system and to monitor actual system operation.

In certain examples and in contrasts to existing systems, an example liquid application system can custom apply a substance using a different flow rate of the substance at each distribution section of the system. In certain examples, an agricultural liquid application system can include multiple sections with each section having multiple distribution nozzles or blades. Such a system can apply a substance according to a coverage map and can adjust flow rates of each distribution section automatically using a metering device of the distribution section, where the flow rate of a section can be based on the coverage map, and the speed and position of the applicator system.

FIG. 1 illustrates generally a self-propelled vehicle such as a tractor 100 with an example liquid applicator system 101 superimposed with a custom coverage map 103. In certain examples, the liquid applicator system 101 can include a reservoir 104 of the application liquid, feed lines 105 coupled to the reservoir 104 and to one or more sections 106. Each section 106 can supply liquid to one or more nozzles to distribute the substance. A nozzle can be coupled to an outlet port, such as by a tube or hose that extends down from a tool bar for example. The liquid can be applied or dispensed using the nozzles of an outlet port. A blade or coulter can also be associated with each outlet port. In certain examples, the liquid applicator system 101 can include instrumentation and controls to change a dispensing rate, or an application rate, of the substance at each section 106 based on the position of the liquid applicator system 101 within the area of the custom coverage map 103. In certain examples, the instrumentation and controls can independently adjust the application rate of each section 106 using automated flow controls integrated with each section 106.

In certain examples, the liquid applicator system 101 can include an electronic version of the custom coverage map 103 in memory associated with an applicator controller. The custom coverage map 103 can include coverage information of the substance for the area within the limits of the custom coverage map 103. The custom coverage map 103 of FIG. 1 includes gradient lines (103a, 103b, 103c) associated with the coverage information. In certain examples, the liquid applicator system 101 can apply a liquid or gas substance using the custom coverage map 103 and can control the application flow of an individual section 106 based on the location of the section 106 relative to the custom coverage map 103, coverage information indicated by the custom coverage map 103 for the location, and the speed of the liquid applicator system 101. In certain examples, the liquid applicator system 101 can include a frame designed to couple to the tractor 100 and can be pulled through a field. In some examples, the liquid applicator system 101 can be self-propelled.

Figure 2:
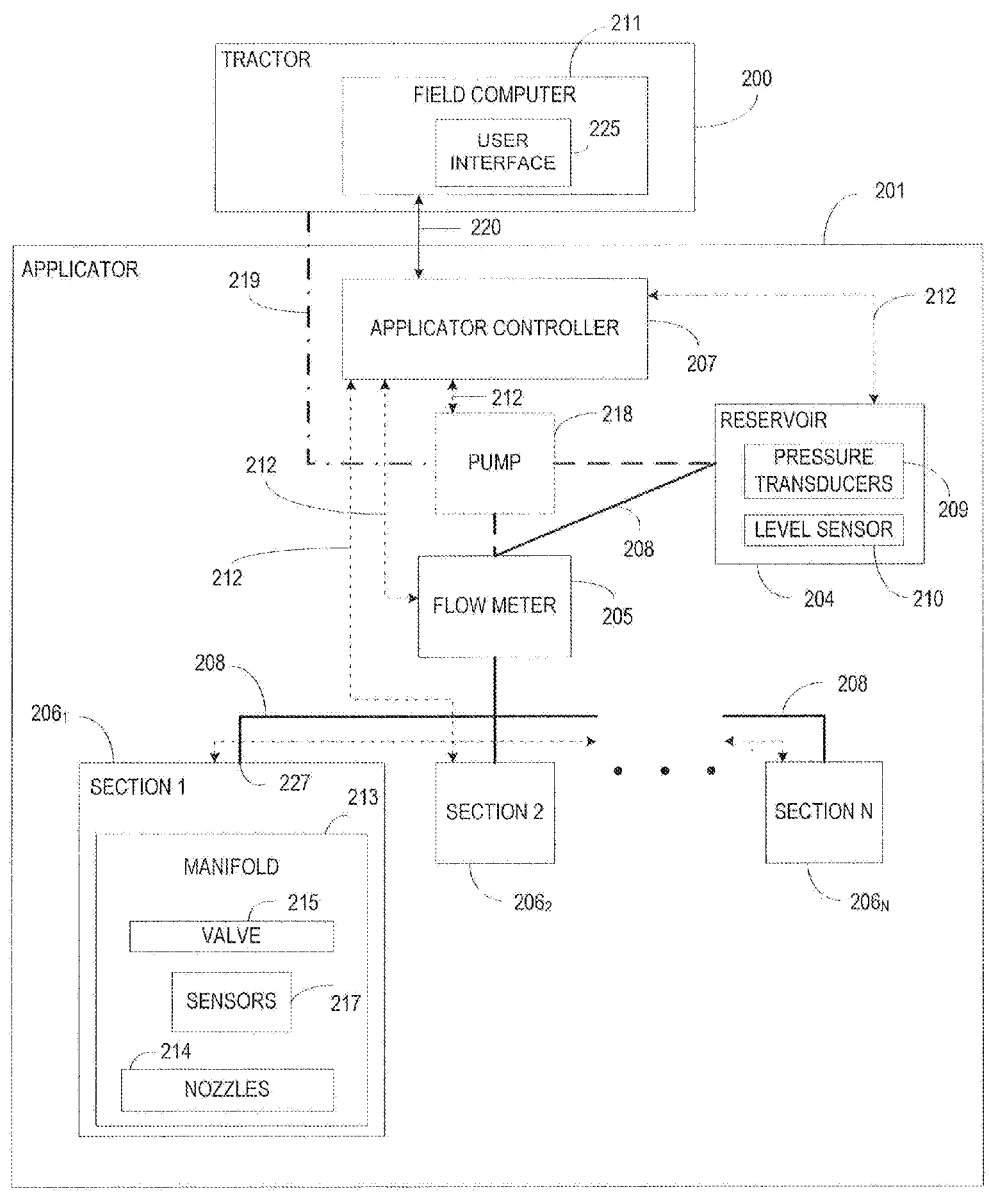
FIG. 2 illustrates generally a block diagram of portions of an example of architecture of an example applicator.

FIG. 2 illustrates generally a block diagram of portions of an example of an applicator 201. In certain examples, the system 201 can include a reservoir 204, a flow meter 205, and a number of sections 206i to distribute a substance supplied by the reservoir 204, and an applicator controller 207 to control the application rate of the substance using controls of the distribution path 208 of the substance. In certain examples, the reservoir 204 can provide a supply of the substance and can include sensors 209, 210 to detect reservoir pressure and reservoir level information. In certain examples, the pressure and level information of the reservoir 204 can be communicated to the applicator controller 207 or other controllers such as a field computer 211. In certain examples, the reservoir 204 can be directly mounted to the applicator 201. In some examples, the reservoir 204 can include a frame separate from the applicator 201 and can be coupled to the applicator 201 and towed with the applicator 201. In certain examples, power and communication can be provided using a wired 212 or wireless link to the reservoir sensors 209, 210.

In certain examples, the applicator 201 can include one or more optional pumps 218 to draw the substance from the reservoir 204 and supply the substance to the sections 206i. In some examples, the pump 218 can be adjustable and can be controlled by the applicator controller 207 to provide one or both of an aggregated pressure and an aggregated flow of the substance to the sections 206i in accordance with an aggregate flow rate determined at the applicator controller 207. In some examples, the aggregate flow rate can be based on the position and speed of the applicator, the relative position of the coverage area of each of the sections 206i with respect to the custom coverage map, and the desired substance coverage associated with the relative positions of the sections 206i as provided by the custom coverage map. In certain examples, the applicator controller 207 can use the flow information from the flow meter 205 to provide feedback information to more accurately control the pump 218. In certain examples, the pump 218 can include a motor. In certain examples, a coupling 219 can connect the pump 218 with a motor on another device such as a tractor 200. The motor can include but is not limited to an electric motor, a pneumatic motor, an internal combustion engine, a hydraulic motor or combinations thereof. In certain examples, power and communication can be provided between the pump 218 and other applicator components, such as the applicator controller 207, using a wired 212 or wireless link.

In certain examples, the flow meter 205 can provide flow information to the applicator controller 207, for example, for flow control feedback, calibration, historic data collection or combinations thereof. In certain examples, the flow meter 205 can include multiple flow meters, for example, for expanding the range of flow detection of the applicator 201. In certain examples, power and communication can be provided between the flow meter and other applicator components using a wired 212 or wireless link.

In certain examples, the applicator 201 can include one or more foldable components that can hold the sections 206i. In some examples, a pump enable or flow enable control valve can be coupled to the fold controls such that the flow of the substance can be disabled when the foldable components are not in position to dispense the substance.

In certain examples, the applicator controller 207 can provide control information to the various control elements of the applicator 201 and can monitor the status and operation of the applicator 201 including the status of the reservoir. The applicator controller 207 can include one or more of hardware circuits, firmware, or software to perform the functions described. The applicator controller 207 may include a processor (e.g., a microprocessor) or an application specific integrated circuit (ASIC). In some examples, the applicator controller 207 includes memory and can store parameters associated with the applicator 201 to assist with the control of the applicator 201. Such parameters can include, but are not limited to, the relative position of each of the sections 206i relative to a base position of the applicator 201, flow profiles of the servo valves 215, flow profiles of the optional pumps 218, and one or more custom coverage maps. In certain examples, the applicator controller 207 can communicate with the applicator control components and sensors using a wired 212 or a wireless communication link. In some examples, a communication interface of the applicator controller can include a control area network (CAN) interface.

In certain examples, the applicator controller 207 can include a global positioning system (GPS) interface to receive or assist in determining the speed and position information of the applicator 201. In certain examples, speed and position information can be received at the applicator controller 207 from a field computer 211, such as a field computer associated with a tractor 200 pulling the applicator. In certain examples, power and communication can be provided between the applicator 201, including the applicator controller 207, and the field computer 211 using a wired 220 or wireless link.

In certain examples, each section 206i of the applicator 201 can receive the substance and can distribute the substance to a field. In certain examples, each section, such as the first section 206₁, for example, can include a distribution manifold 213 to distribute the substance. The distribution manifolds and the applicator controller 207 can be mounted to the frame of the applicator 201.

A distribution manifold 213 can include an inlet port 227 configured to receive the substance from the distribution path 208, and multiple outlet ports. An outlet port can include a nozzle 214, configured to apply the substance, and one or more sensors 217 located at the outlet port. In certain examples, the sensors are located at the nozzle of the outlet port. In certain examples, the nozzle of an outlet port includes a restriction, and one or more sensors are located at or near the restriction of the nozzle.

A sensor may produce an electrical sensor signal that is representative of a distribution parameter at the nozzle. An outlet port can include multiple sensors of different types. Some examples of the sensor include pressure sensor, a flow sensor, a sound sensor and a temperature sensor. The sensor signal can be representative of nozzle pressure, nozzle flow, nozzle temperature, and sound at a nozzle. The distribution parameter can include a measure related to, among other things, pressure, flow, temperature, or sound. More than one type of sensor signal may be produced at one outlet port, and more than one distribution parameter can be measured for an outlet port.

A distribution manifold 213 can include a controllable valve 215 that supplies the substance to the inlet port 227 and then to the plurality of outlet ports and plurality of nozzles 214. In certain examples, the controllable valve 215 is a servo valve. In some examples, the servo valve can include a servo actuator, a valve and a servo controller. In an example, the servo controller can receive flow command information from the applicator controller 207 via a wired 212 or wireless link and can control the valve to provide the proper flow for the custom coverage. In certain examples, the valve can include, but is not limited to, a ball valve, a butterfly valve, a gate valve, a glove valve, a poppet valve, and a spool valve. In certain examples, the valve can range in size from about ¼ inch (in) to about 6 in, however other sizes are possible without departing from the scope of the present subject matter. In certain examples, different sections may have different types of valves. In certain examples, a position sensor, such as an encoder, resolver, or potentiometer, can be coupled to the valve to provide position and/or velocity feedback of the valve to the servo controller.

In certain examples, a servo valve can include a servo actuator to move and position the valve. In some examples the actuator can receive a command signal from the servo controller and can move the valve using the command signal. The servo actuator can include, but is not limited to, a rotary actuator, a linear actuator, an electric actuator, a pneumatic actuator, a hydraulic actuator, or combinations thereof. In some examples, the servo controller can use a velocity loop to control the actuator. In some examples, the servo controller can use a torque loop to control the actuator.

The applicator 201 can include a user interface 225 electrically coupled to the applicator controller 207 via a wired 220 or wireless link. The user interface 225 can include one or more of a display, a touchscreen display, a keyboard or keypad, and a mouse. The user interface 225 may be incorporated into the field computer 211 or be separate from the field computer 211. In certain examples, the user interface 225 is included in a second device (e.g., a smart phone or tablet computer) executing an application or "app" to send input to the applicator controller 207.

One or more electrical signals produced by the one or more sensors 217 of an outlet port can be received by the applicator controller 207 via the wired 212 or wireless link. The applicator controller 207 measures the value of a distribution parameter using the sensor signal produced by the at least one sensor of an outlet port. Some examples of the distribution parameter include nozzle pressure, nozzle temperature, substance flow in a nozzle and sound level at a nozzle. When a fault or variation in the distribution of the substance occurs at the distribution manifold 213, the applicator controller 207 may detect when the measured value of the distribution parameter differs from a specified (e.g., programmed) target value for the distribution parameter by more than a specified error threshold value. When the detection occurs, the applicator controller 207 may present an indication on the user interface 225 that the measured value differs from the target value according to the detection.

In certain examples, the target value for the distribution parameter can be specified by being calculated by the applicator controller 207 based on settings (e.g., a flow rate setting) for the distribution. In certain examples, the target value for the distribution parameter can be directly programmed into the applicator controller 207.

In some examples, the applicator controller 207 measures a value for the distribution parameter for each outlet port or substantially each outlet port. The applicator controller 207 may compare these measured values, and detect that one or more of the measured values differ from other measured values by more than the specified error threshold value. In certain examples, the applicator controller 207 may determine the target value of the parameter as the measured value determined from a majority of the outlet ports. An outlet port is determined to have a fault or to vary from the target distribution when the measured value differs from the other measured values by more than the error threshold value (e.g., the measured value is an outlier measurement).

In certain examples, the applicator controller 207 first calculates a steady state value for the distribution parameter at the outlet ports using measured values for the parameter. An outlet port is determined to have a fault or to vary from the target distribution when the measured value differs from the steady state value by more than the error threshold value. The user interface 225 can include a graphical user interface (GUI) that displays a representation of one or more of distribution manifolds, outlet ports and nozzles. The user interface 225 may present an indication of the location of the nozzle that produced the measured value of the distribution parameter that differed from the specified target value.

In certain examples, the applicator controller adjusts a position of the controllable valve of an outlet port when detecting that the measured value of the parameter for that outlet port differs from the specified target value by more than the specified error threshold value. If the applicator controller 207 re-measures the distribution parameter and detects that measured value remains different from the specified target value by more than the specified error threshold value after adjusting the valve, the applicator controller 207 may present an error using the user interface. If the applicator controller 207 re-measures the distribution parameter and detects that measured value satisfies the specified target value for the parameter, the applicator controller 207 may remove indications of fault or variation of distribution from the user interface 225.

The applicator controller 207 can measure separate distribution parameters for each of the distribution manifolds. The applicator controller 207 may present a separate indication of fault or variation in distribution for more than one distribution manifold when a measured distribution parameter of an outlet port of the distribution manifolds differs from the specified target value.

As explained previously herein, the applicator controller 207 may measure different types of distribution parameters for each outlet port. The applicator controller 207 may present a separate indication of fault or variation in distribution for more than one outlet port. The separate indications may show different types of distribution parameters used to detect the fault or variation in distribution. These different types of distribution parameters can include a parameter related to flow at an outlet port, a parameter related to pressure at an outlet port, a parameter related to temperature at an outlet port, and a parameter related to sound at an outlet port.

In some examples, the one or more sensors at an outlet port can include a flow sensor (e.g., a flow meter), and the distribution parameter measured at an outlet can include flow rate. Flow rate can be used to determine whether the distribution by the outlet port varies from the distribution of other outlet ports. When detecting that a flow rate at an outlet port is not meeting a target flow rate, the applicator controller 207 may automatically adjust the controllable valve to adjust the flow rate to meet a target flow rate. In certain examples, the one or more sensors at an outlet can include a capacitive flapper. The capacitive flapper can provide a measurable capacitance that varies when the substance is flowing or not flowing through the outlet port. The capacitive flapper can provide a true/false indication that flow is occurring through an outlet nozzle. The true/false indication can be used to determine whether an outlet port is blocked or clogged.

In some examples, the one or more sensors at an outlet port can include a pressure sensor (e.g., a pressure transducer) and the distribution parameter includes a measure of pressure such as at a nozzle of an outlet port. The measured pressure can be compared to a target pressure value to detect a fault. In certain examples, the pressure at the nozzle can be compared with a pressure upstream from the nozzle, such as at the controllable valve 215 or inlet port 227. If the application controller 207 does not measure a specified value of pressure drop between the upstream pressure and the nozzle pressure, this may indicate that the nozzle is clogged or otherwise compromised.

In some examples, the one or more sensors at an outlet port can include a temperature sensor. An example of a temperature sensor is a thermocouple. A thermocouple can provide a sensor signal that varies with temperature. In certain examples, the temperature sensing device includes a thermally conductive tube, an orifice, a thermal insulating material, and the thermocouple. The thermally conductive tube could be made of any materials such as but not limited to mild steel, aluminum, stainless steel, copper, and brass. Different temperature sensing devices can be of various lengths, shapes and diameters. The orifice could be made of varying material types and of varying orifice sizes and internal diameters. The insulating materials could be of varying insulating materials, sizes and shapes. The thermocouple could be of varying materials and sizes. In certain examples the orifice is used to access a tube or hose at an outlet port or to access the nozzle. The thermally conducting tube and thermocouple can be fitted into the orifice (e.g., as a plug) to monitor temperature at the outlet port or nozzle.

A shift in a measured temperature value at an outlet port may indicate an obstruction to flow at that outlet port. In certain examples, a temperature measured at one outlet port that varies compared to the temperature measured at the other outlet ports in the applicator 201 may indicate an obstruction to flow at that one outlet port. Different degrees of temperature change may indicate different flow rates in an outlet port, and a limit temperature value may indicate a complete obstruction.

In certain examples, the temperature sensor includes a thermistor mounted in a nozzle of an outlet port. A thermistor provides a measurable resistance that varies with temperature. The thermistor may be biased (e.g., with a current) to cause the thermistor to self-heat. If the thermistor is biased with a current, voltage of the thermistor can be measured. By Ohm's law, the voltage measured at each nozzle should be at a target value determined by the nozzle temperature or within a target voltage range. A variation in temperature at one nozzle due to variation in flow rate at the nozzle will cause a voltage measurement to be different from the voltage measurement at the other nozzles. When the voltage measurement exceeds a specified threshold difference, the applicator controller 207 may produce an indication of the variation. Thus, a measurement of a nozzle relative to measurements of other nozzles is used to detect a problem. Similarly, the thermistor could be biased with a voltage and a current could be measured to detect a change in temperature at a nozzle.

In some examples, the one or more sensors at an outlet port can include a sound sensor (e.g., a microphone or vibration sensing transducer). A variation in sound at one nozzle as compared to the other nozzles in the applicator 201 may indicate an obstruction to flow at that one outlet port.

Figure 3:
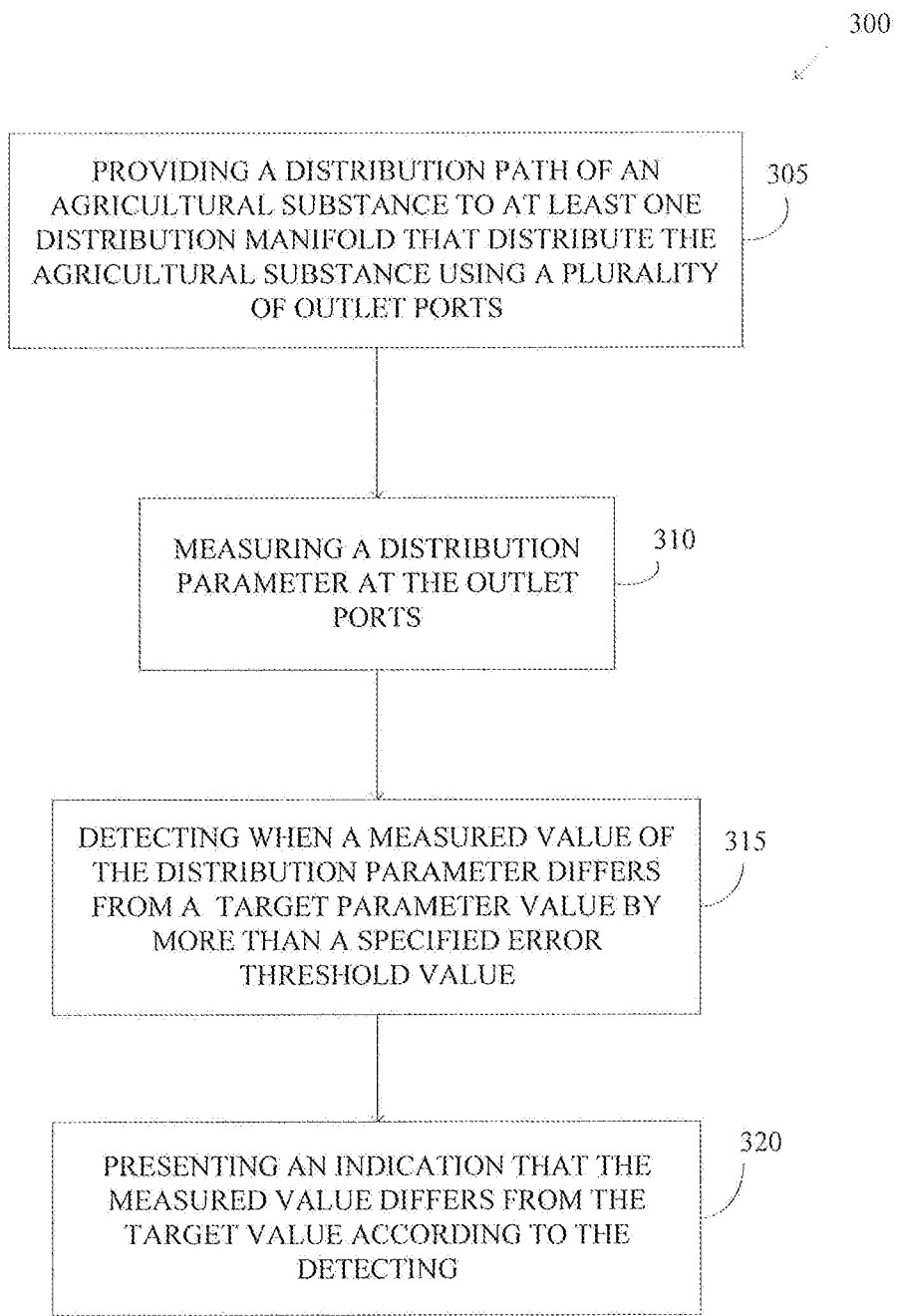
FIG. 3 illustrates generally a flow diagram of an example of a method of operating an example applicator system.

FIG. 3 illustrates a flow diagram of an example of a method 300 of operating an example applicator system. The applicator system distributes an agricultural substance. At block 305, a distribution path of an agricultural substance is provided to at least one distribution manifold. The at least one distribution manifold receives the substance at an inlet port and distributes the agricultural substance using a plurality of outlet ports. The outlet ports can include nozzles arranged at spaced locations along the distribution manifold.

At block 310, a distribution parameter is measured at the outlet ports. The distribution parameter can be determined from a sensor located at the outlet port. An outlet port may include multiple types of sensors to provide measured values of multiple types of distribution parameters. The distribution parameter can include, among other things, the distribution parameters described previously herein.

At block 315, a measured value of the distribution parameter is detected that differs from a target parameter value, or a target range of parameter values, by more than a specified error threshold value. One or both of the target parameter value and the error threshold may be calculated by the applicator system or programmed into the applicator system.

At block 320, an indication is presented using a user interface that the measured value differs from the target value according to the detecting. The indication may show the type of the distribution parameter that differed from a target value or range by a threshold error value, and may show the location of the outlet port where the error occurred. If multiple types of distribution parameters are measured, the user interface may show multiple outlet ports with errors of more than one type.

Figure 4:
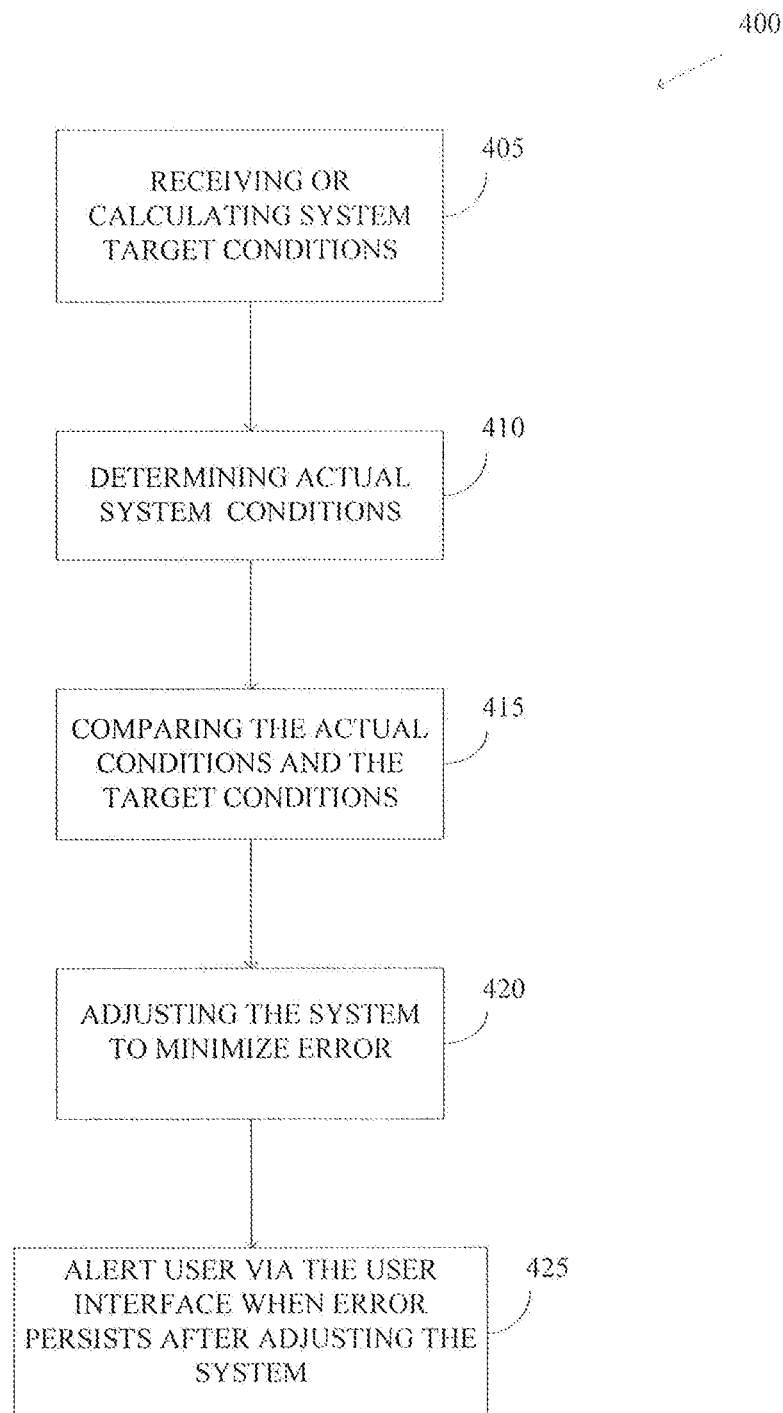
FIG. 4 illustrates generally a flow diagram of another example of a method of operating an example applicator system.

FIG. 4 illustrates a flow diagram of another example of a method 400 of operating an example applicator system to distribute an agricultural substance. At block 405, target conditions for the applicator system are either received into the applicator system or calculated by the applicator system. Target conditions for the system can include target values for one or more parameters related to distribution of an agricultural substance by the applicator system. Some examples of parameters related to distribution include, among other things, pressure at an outlet port of the system, flow and rate of flow of the substance at an outlet port of the system, temperature of an outlet port of the system, and a measure of sound at an outlet port of the system.

At block 410, the actual conditions of the system (including conditions at one or more sections and distribution manifolds of the system) are measured or derived from measurements made by the system. The actual system conditions can be determined using sensors to monitor distribution parameters at multiple points distributed throughout the system.

At block 415, the actual conditions of the system are compared to the target conditions for the system. Errors in the distribution of the substance by the system can be determined from the comparison. These errors can result from system fault conditions such as clogged outlet ports, clogged nozzles of outlet ports, and variation in the rate of application of the substance (e.g., too high of an application rate or too low of an application rate). The sensors allow the system to determine the location of the error or errors.

At block 415, the system adjusts one or more control components of the system to minimize or correct the detected error or errors. For instance, the system may adjust a position of a controllable valve or change a pump setting in attempt to correct flow at one or more outlet ports at one or more sections of the system. If an error persists after the attempts at self-adjustment by the system, one or both of the location and type of fault can be presented (e.g., displayed) to a system operator via a user interface of the system.

Positioning sensors at outlet ports of an applicator and automatically monitoring sensor parameters can provide feedback from each outlet port or nozzle instead of limiting feedback to an aggregate of the overall system. This improved feedback can be part of a detection system that allows for pinpointing the outlet port or nozzle that is causing the problem and alerting the user to the problem port or nozzle.

Such a system can detect obstructions in an $NH_3$ field-application system or uneven distribution by the system to variation in performance of the outlet ports used to apply the $NH_3$ to an agricultural field. The detection system also provides a centralized error indication system that can be located at the point of operation (e.g., in a vehicle cab) removing the need for an operator to inspect multiple points of the applicator to discover the location of a problem.

Additional Notes and Examples

Example 1 can include or use subject matter (such as an apparatus) including at least one distribution manifold, a user interface and an applicator controller electrically coupled to the user interface. The at least one distribution manifold is configured to distribute a substance and can include an inlet port configured to receive the substance, a plurality of outlet ports, and a controllable valve configured to supply the substance to the inlet port. An outlet port can include a nozzle configured to release the substance and can include at least one sensor configured to produce an electrical sensor signal representative of a distribution parameter at the nozzle. The applicator controller can be configured to: measure a value of the distribution parameter using the sensor signal produced by the at least one sensor of an outlet port, detect when the measured value differs from a specified target value by more than a specified error threshold value, and present an indication, using the user interface, that the measured value differs from the target value according to the detection.

Example 2, can include, or can optionally be combined with the subject matter of Example 1 to include, an applicator controller configured to adjust a position of the controllable valve when detecting that the measured value of the distribution parameter differs from the specified target value by more than the specified error threshold value, and present an error using the user interface when detecting that the measured value remains different from the specified target value by more than the specified error threshold value after adjustment of the position of the controllable valve.

Example 3 can include, or can optionally by combined with the subject matter of one or any combination of Examples 1 and 2 to include, an applicator controller configured to measure the value of the distribution parameter for each outlet port, compare measured values, and detect that a first measured value for a first outlet port differs from a specified target value when the first measured value differs from measured values for other outlet ports by more than the specified error threshold value.

Example 4 can include, or can optionally be combined with the subject matter of one or any combination of Examples 1-3 to include, a user interface configured to present an indication of the location of the nozzle that produced the measured value of the distribution parameter that differed from the specified target parameter value.

Example 5 can include, or can optionally be combined with the subject matter of one or any combination of Examples 1-4 to include, at least one sensor that includes at least one of a nozzle pressure sensor, a nozzle flow sensor, a sound sensor, or a nozzle temperature sensor.

Example 6 can include, or can optionally be combined with the subject matter of one or any combination of Examples 1-5 to include, an outlet port that includes a plurality of sensors of different types, including at least two sensors selected from the group consisting essentially of a nozzle pressure sensor, a nozzle flow sensor, a sound sensor, or a nozzle temperature sensor, and wherein the user interface is optionally configured to present a type of distribution parameter that differs from a specified target value for the type of distribution parameter.

Example 7 can include, or can optionally be combined with the subject matter of one or any combination of Examples 1-6 to include, a controllable valve that is a servo valve that includes a servo actuator, a valve and a servo controller, and wherein the applicator controller is configured to transmit valve position information to the servo controller via a wired or wireless link to adjust flow of the valve using the servo actuator.

Example 8 can include, or can optionally be combined with the subject matter of one or any combination of Examples 107 to include, a nozzle of an outlet port that includes a restriction, and wherein the at least one sensor is located at or near the restriction.

Example 9 can include, or can optionally be combined with the subject matter of one or any combination of Examples 1-8 to include, a plurality of distribution manifolds, wherein the applicator controller is configured to measure separate distribution parameters for each of the plurality of distribution manifolds, and present a separate indication for more than one distribution manifold when a measured distribution parameter of the distribution manifolds differs from the specified target parameter value.

Example 10 can include, or can optionally be combined with the subject matter of one or any combination of Examples 1-9 to include, an outlet port of a first distribution manifold of a plurality of distribution manifolds that includes a ball valve, and wherein a second distribution manifold of the plurality of distribution manifolds includes at least one of a gate valve, a globe valve, a butterfly valve, a poppet valve, or a spool valve.

Example 11 can include, or can optionally be combined with the subject matter of one or any combination of Examples 1-10 to include a wired network communication interface, wherein the applicator controller is optionally coupled to a controllable valve of at least one of a plurality of distribution manifolds using the wired network communication interface.

Example 12 can include, or can optionally be combined with the subject matter of one or any combination of Examples 1-11 to include, a wireless network communication interface, wherein the applicator controller is coupled to a controllable valve of at least one of a plurality of distribution manifolds using the wireless network communication interface.

Example 13 can include, or can optionally be combined with the subject matter of one or any combination of Examples 1-12 to include, an applicator frame configured to couple to a self-propelled vehicle, wherein the applicator controller and a plurality of distribution manifolds are mounted to the applicator frame.

Example 14 can include, or can optionally be combined with the subject matter of Example 13 to include, a second frame configured to couple to the self-propelled vehicle, the second frame including a reservoir configured to supply the substance.

Example 15 can include subject matter, or can optionally be combined with the subject matter of one or any combination of Examples 1-14 to include subject matter (such as an apparatus, a method, a means for performing acts, or a machine readable medium including instructions that, when performed by the machine cause the machine to perform acts), including providing a distribution path of an agricultural substance to at least one distribution manifold (wherein the at least one distribution manifold is configured to receive the substance at an inlet port and distribute the agricultural substance using a plurality of outlet ports that include nozzles arranged at spaced locations along the distribution manifold), measuring a distribution parameter at the outlet ports, detecting when a measured value of the distribution parameter differs from a target parameter value by more than a specified error threshold value, and presenting, using a user interface, an indication that the measured value differs from the target value according to the detecting.

Example 16 can include subject matter, or can optionally be combined with the subject matter of Example 15 to include, adjusting a position of a controllable valve that supplies the substance to the inlet port when detecting that the measured parameter differs from the target value range for the parameter, and wherein presenting the indication includes presenting an error using the user interface when detecting that the measured value of the parameter remains different from a specified target parameter value by more than the specified error threshold value after an adjustment of the position of the controllable valve.

Example 17 can include, or can optionally be combined with the subject matter of one or any combination of Examples 15 and 16 to include, determining a steady state value for distribution parameter at the outlet ports, and wherein detecting when a measured value of the distribution parameter differs from a target parameter value by more than a specified error threshold value includes detecting when the measurement of performance differs from the steady state value by the specified error threshold value.

Example 18 can include, or can optionally be combined with the subject matter of one or any combination of Examples 15-17 to include, presenting an indication of the location of an outlet port that produced the measured value of the parameter that differs from the target parameter value.

Example 19 can include, or can optionally be combined with the subject matter of one or any combination of Examples 15-18 to include, determining a measure of at least one of pressure of the outlet ports, temperature of the outlet ports, flow of the substance at the outlet ports, or sound level at the outlet ports.

Example 20 can include, or can optionally be combined with the subject matter of one or any combination of Examples 15-19 to optionally include, measuring, at an outlet port, at least two types of distribution parameters from the group consisting essentially of pressure of the outlet ports, temperature of the outlet ports, flow of the substance at the outlet ports, or sound level at the outlet ports, and wherein presenting an indication includes presenting a type of distribution parameter that differs from the target parameter value using the user interface.

Example 21 can include, or can optionally be combined with the subject matter of one or any combination of Examples 15-20 to include, measuring a distribution parameter at the outlet ports includes measuring, at an outlet port, the distribution parameter at a restriction of a nozzle included in an outlet port.

Example 22 can include, or can optionally be combined with the subject matter of one or any combination of Examples 15-21 to include measuring temperature of a nozzle at an outlet port using a thermistor.

Example 23 can include, or can optionally be combined with any portion or combination of any portions of any one or more of Examples 1 through 22 to include, subject matter that can include means for performing any one or more of the functions of Examples 1 through 22, or a machine-readable medium including instructions that, when performed by a machine, cause the machine to perform any one or more of the functions of Examples 1 through 22.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An agricultural applicator apparatus comprising:
   at least one distribution manifold configured to distribute a substance, the at least one distribution manifold including:
      an inlet port configured to receive the substance;
      a plurality of outlet ports, wherein an outlet port includes a nozzle configured to release the substance and at least one sensor configured to produce an electrical sensor signal representative of a distribution parameter at the nozzle; and
      a controllable valve configured to supply the substance to the inlet port;
   a user interface; and
   an applicator controller electrically coupled to the user interface and configured to:
      measure a value of the distribution parameter using the sensor signal produced by the at least one sensor of an outlet port;
      detect when the measured value differs from a specified target value by more than a specified error threshold value;
      adjust a position of the controllable valve to adjust the value of the distribution parameter toward the specified target value in response to detecting that the measured value of the distribution parameter differs from the specified target value by more than the specified error threshold value; and
      present an indication, using the user interface, that the measured value differs from the target value according to the detection.

2. The apparatus of claim 1, wherein the applicator controller is configured to present an error using the user interface when detecting that the measured value remains different from the specified target value by more than the specified error threshold value after adjustment of the position of the controllable valve.

3. The apparatus of claim 1, wherein the applicator controller is configured to measure the value of the distribution parameter for each outlet port, compare measured values, and detect that a first measured value for a first outlet port differs from a specified target value when the first measured value differs from measured values for other outlet ports by more than the specified error threshold value.

4. The apparatus of claim 1, wherein the user interface is configured to present an indication of the location of the nozzle that produced the measured value of the distribution parameter that differed from the specified target parameter value.

5. The apparatus of claim 1, wherein the at least one sensor includes at least one of a nozzle pressure sensor, a nozzle flow sensor, a sound sensor, or a nozzle temperature sensor.

6. The apparatus of claim 1, wherein an outlet port includes a plurality of sensors of different types, including at least two sensors selected from the group consisting essentially of a nozzle pressure sensor, a nozzle flow sensor, a sound sensor, or a nozzle temperature sensor, and wherein the user interface is configured to present a type of distribution parameter that differs from a specified target value for the type of distribution parameter.

7. The apparatus of claim 1, wherein the controllable valve is a servo valve that includes a servo actuator, a valve and a servo controller, and wherein the applicator controller is configured to transmit valve position information to the servo controller via a wired or wireless link to adjust flow of the valve using the servo actuator.

8. The apparatus of claim 1, wherein a nozzle of an outlet port includes a restriction, and wherein the sensor is located at or near the restriction.

9. The apparatus of claim 1, including a plurality of distribution manifolds, wherein the applicator controller is configured to measure separate distribution parameters for each of the plurality of distribution manifolds, and present a separate indication for more than one distribution manifold when a measured distribution parameter of the distribution manifolds differs from the specified target parameter value.

10. The apparatus of claim 9, wherein an outlet port of a first distribution manifold of the plurality of distribution manifolds includes a ball valve, and wherein a second distribution manifold of the plurality of distribution manifolds includes at least one of a gate valve, a globe valve, a butterfly valve, a poppet valve, or a spool valve.

11. The apparatus of claim 9, including a wired network communication interface, wherein the applicator controller is coupled to a controllable valve of at least one of the plurality of distribution manifolds using the wired network communication interface.

12. The apparatus of claim 9, including a wireless network communication interface, wherein the applicator controller is coupled to a controllable valve of at least one of the plurality of distribution manifolds using the wireless network communication interface.

13. The apparatus of claim 9, including an applicator frame configured to couple to a self-propelled vehicle, wherein the applicator controller and the plurality of distribution manifolds are mounted to the applicator frame.

14. The apparatus of claim 13, including a second frame configured to couple to the self-propelled vehicle, the second frame including a reservoir configured to supply the substance.

15. A method for monitoring performance of an agricultural applicator, the method comprising:
   providing a distribution path of an agricultural substance to at least one distribution manifold, wherein the at least one distribution manifold is configured to receive the substance at an inlet port and distribute the agricultural substance using a plurality of outlet ports that include nozzles arranged at spaced locations along the distribution manifold;
   measuring a distribution parameter at the outlet ports;

detecting when a measured value of the distribution parameter differs from a target parameter value by more than a specified error threshold value;

adjusting a position of a controllable valve that supplies the substance to the inlet port to move the distribution parameter towards the target parameter value when detecting that the measured parameter differs from the target value range for the parameter; and presenting, using a user interface, an indication that the measured value differs from the target value according to the detecting.

16. The method of claim 15, wherein presenting the indication includes presenting an error using the user interface when detecting that the measured value of the parameter remains different from a specified target parameter value by more than the specified error threshold value after an adjustment of the position of the controllable valve.

17. The method of claim 15, wherein measuring the parameter value includes determining a steady state value for distribution parameter at the outlet ports, and wherein detecting when a measured value of the distribution parameter differs from a target parameter value by more than a specified error threshold value includes detecting when the measurement of performance differs from the steady state value by the specified error threshold value.

18. The method of claim 15, wherein presenting the indication includes presenting an indication of the location of an outlet port that produced the measured value of the parameter that differs from the target parameter value.

19. The method of claim 15, wherein measuring a distribution parameter at the outlet ports includes determining a measure of at least one of pressure of the outlet ports, temperature of the outlet ports, flow of the substance at the outlet ports, or sound level at the outlet ports.

20. The method of claim 15, wherein measuring a distribution parameter at the outlet ports includes measuring, at an outlet port, at least two types of distribution parameters from the group consisting essentially of pressure of the outlet ports, temperature of the outlet ports, flow of the substance at the outlet ports, or sound level at the outlet ports, and wherein presenting an indication includes presenting a type of distribution parameter that differs from the target parameter value using the user interface.

21. The method of claim 15, wherein measuring a distribution parameter at the outlet ports includes measuring, at an outlet port, the distribution parameter at a restriction of a nozzle included in an outlet port.

22. The method of claim 15, wherein measuring a distribution parameter at the outlet ports includes measuring temperature of a nozzle with a thermistor.

* * * * *